United States Patent
Kawamoto et al.

(10) Patent No.: US 9,297,323 B2
(45) Date of Patent: Mar. 29, 2016

(54) VEHICLE DRIVING DEVICE AND VEHICLE DRIVING METHOD

(75) Inventors: Yoshinobu Kawamoto, Atsugi (JP); Masahiro Iriyama, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 63 days.

(21) Appl. No.: 14/344,813

(22) PCT Filed: Jul. 17, 2012

(86) PCT No.: PCT/JP2012/068105
§ 371 (c)(1),
(2), (4) Date: Mar. 13, 2014

(87) PCT Pub. No.: WO2013/038797
PCT Pub. Date: Mar. 21, 2013

(65) Prior Publication Data
US 2014/0365092 A1 Dec. 11, 2014

(30) Foreign Application Priority Data
Sep. 14, 2011 (JP) ................................ 2011-200189

(51) Int. Cl.
*B60W 10/02* (2006.01)
*F02D 41/12* (2006.01)
*B60W 10/06* (2006.01)
*B60W 10/11* (2012.01)
(Continued)

(52) U.S. Cl.
CPC ............. *F02D 41/123* (2013.01); *B60W 10/02* (2013.01); *B60W 10/06* (2013.01); *B60W 10/10* (2013.01); *B60W 10/11* (2013.01); *F02D 41/022* (2013.01); *F02D 41/023* (2013.01); *F02D 41/0205* (2013.01); *F16H 61/0437* (2013.01); *F16H 61/143* (2013.01); *F16H 63/50* (2013.01); *B60W 10/026* (2013.01); *B60Y 2300/46* (2013.01); *F02D 41/126* (2013.01); *F02D 2200/101* (2013.01); *F02D 2200/602* (2013.01); *F02N 2200/0802* (2013.01); *F16H 2059/186* (2013.01)

(58) Field of Classification Search
CPC ................................................ F02N 2200/0802
See application file for complete search history.

(56) References Cited

U.S. PATENT DOCUMENTS

| | | | |
|---|---|---|---|
| 2010/0131160 A1* | 5/2010 | Ayabe et al. | 701/54 |
| 2010/0250074 A1* | 9/2010 | Hirasako et al. | 701/55 |
| 2011/0154931 A1* | 6/2011 | Wright | B60W 10/026 74/473.1 |

FOREIGN PATENT DOCUMENTS

| | | |
|---|---|---|
| JP | 8-285074 A | 11/1996 |
| JP | 2005-313831 A | 11/2005 |

(Continued)

*Primary Examiner* — Ramya Burgess
*Assistant Examiner* — David Morris
(74) *Attorney, Agent, or Firm* — Foley & Lardner LLP

(57) ABSTRACT

An unlock operation of a lockup clutch and a shift-up operation of an automatic transmission are performed together when an accelerator pedal of a vehicle is released in a state where the lockup clutch is in a lockup state. An engine rotation speed immediately after the shift-up operation is estimated on the basis of the engine rotation speed and a gear ratio of the automatic transmission after the shift-up operation. If a fuel recovery operation is predicted to be performed immediately after the shift-up operation, the fuel-cut operation is prevented, thereby suppressing a shock from occurring due to the fuel recovery when a foot release shift-up operation is performed.

9 Claims, 11 Drawing Sheets

(51) Int. Cl.
*F02D 41/02* (2006.01)
*F16H 61/14* (2006.01)
*F16H 63/50* (2006.01)
*F16H 61/04* (2006.01)
*B60W 10/10* (2012.01)
*F16H 59/18* (2006.01)

(56) References Cited

FOREIGN PATENT DOCUMENTS

| | | |
|---|---|---|
| JP | 2006-15819 A | 1/2006 |
| JP | 2007-146965 A | 6/2007 |

* cited by examiner

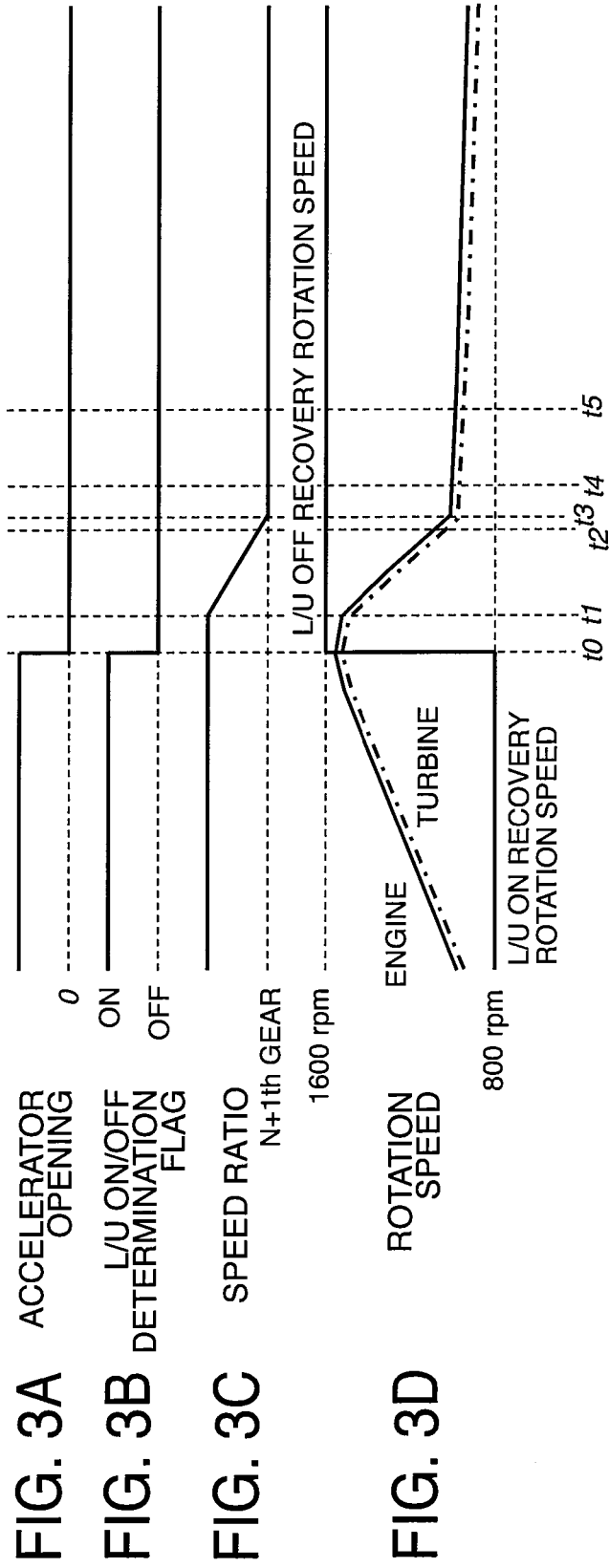

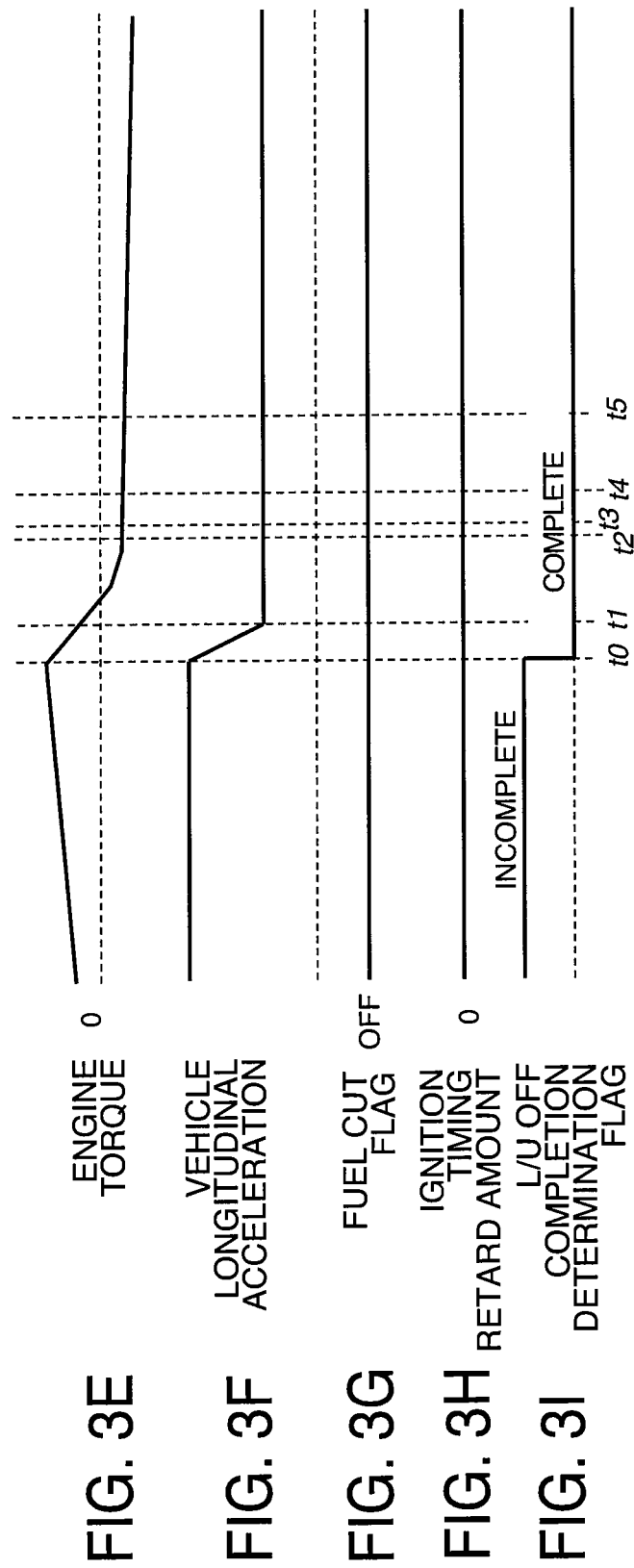

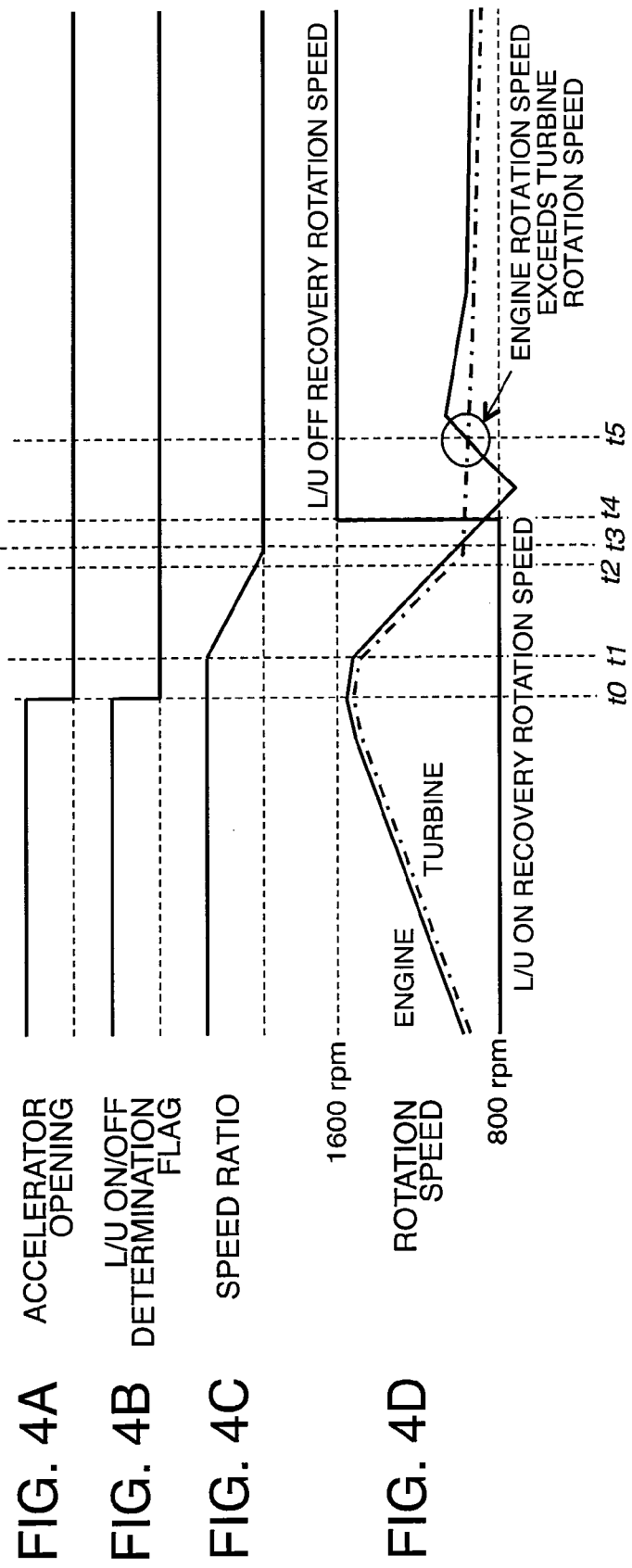

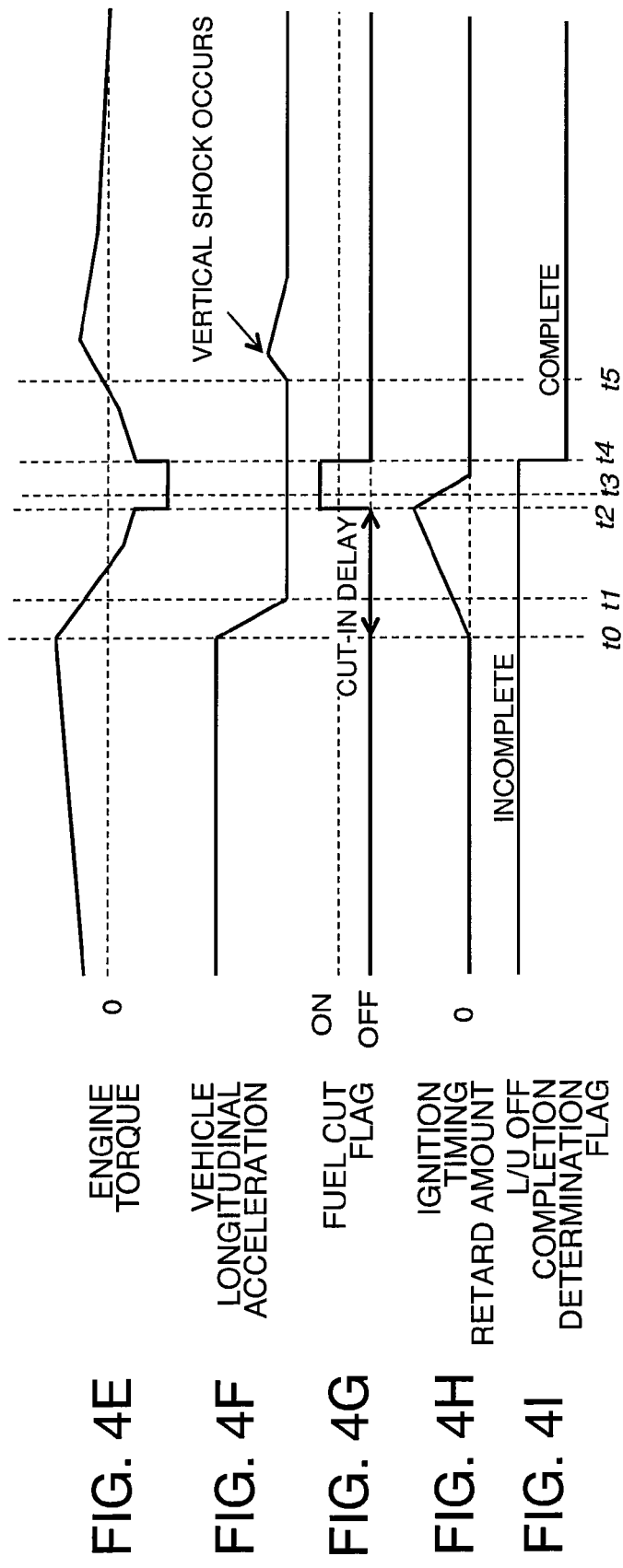

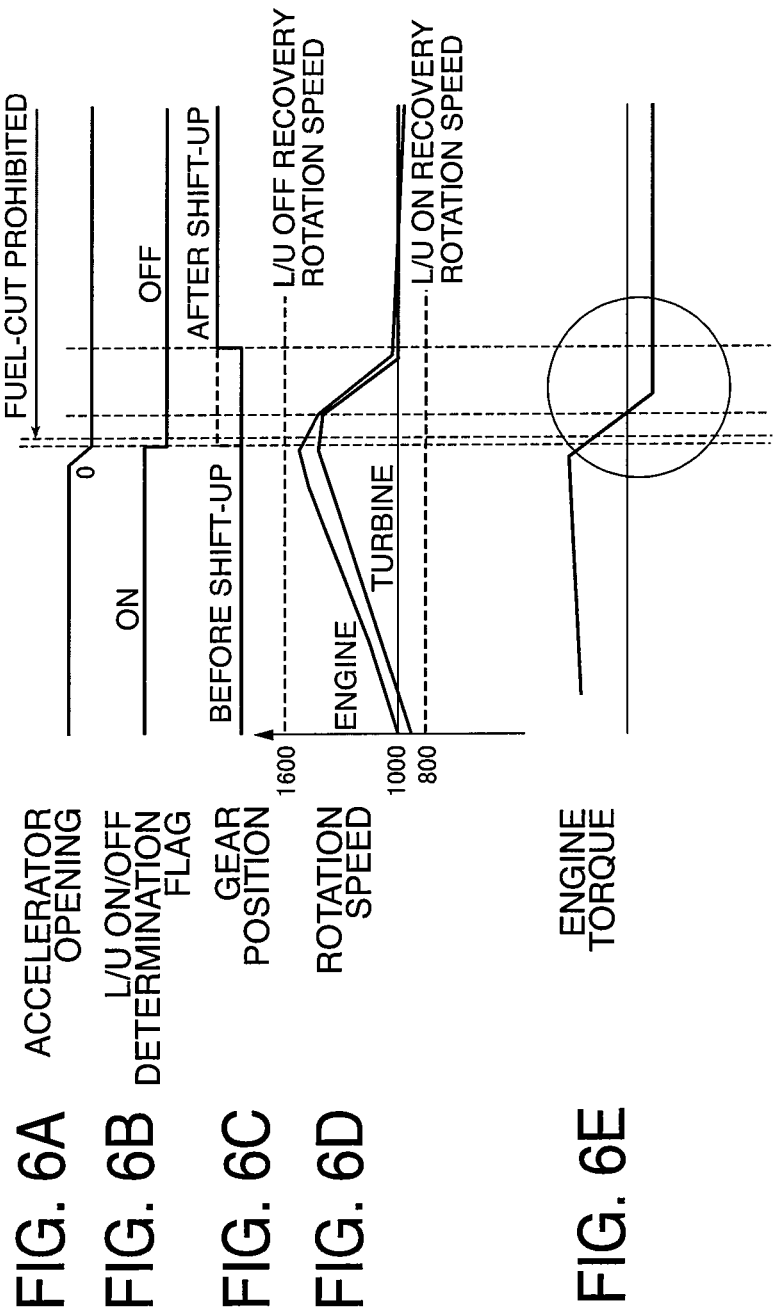

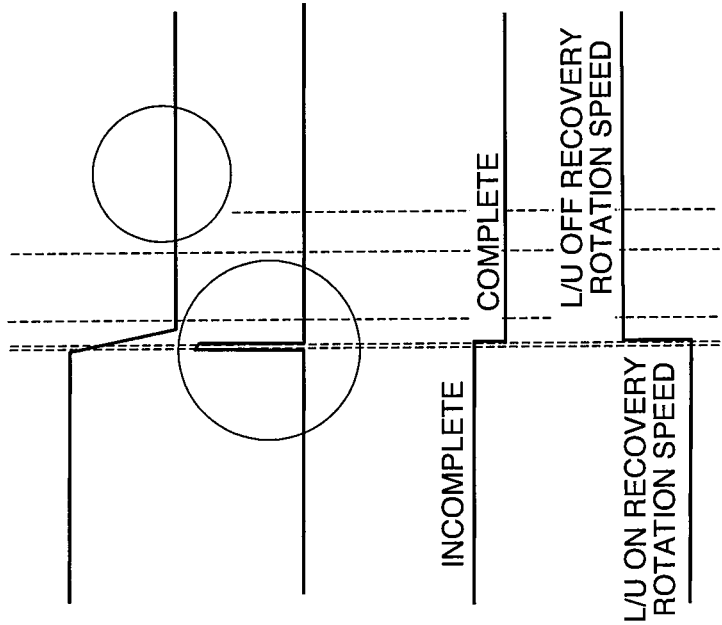

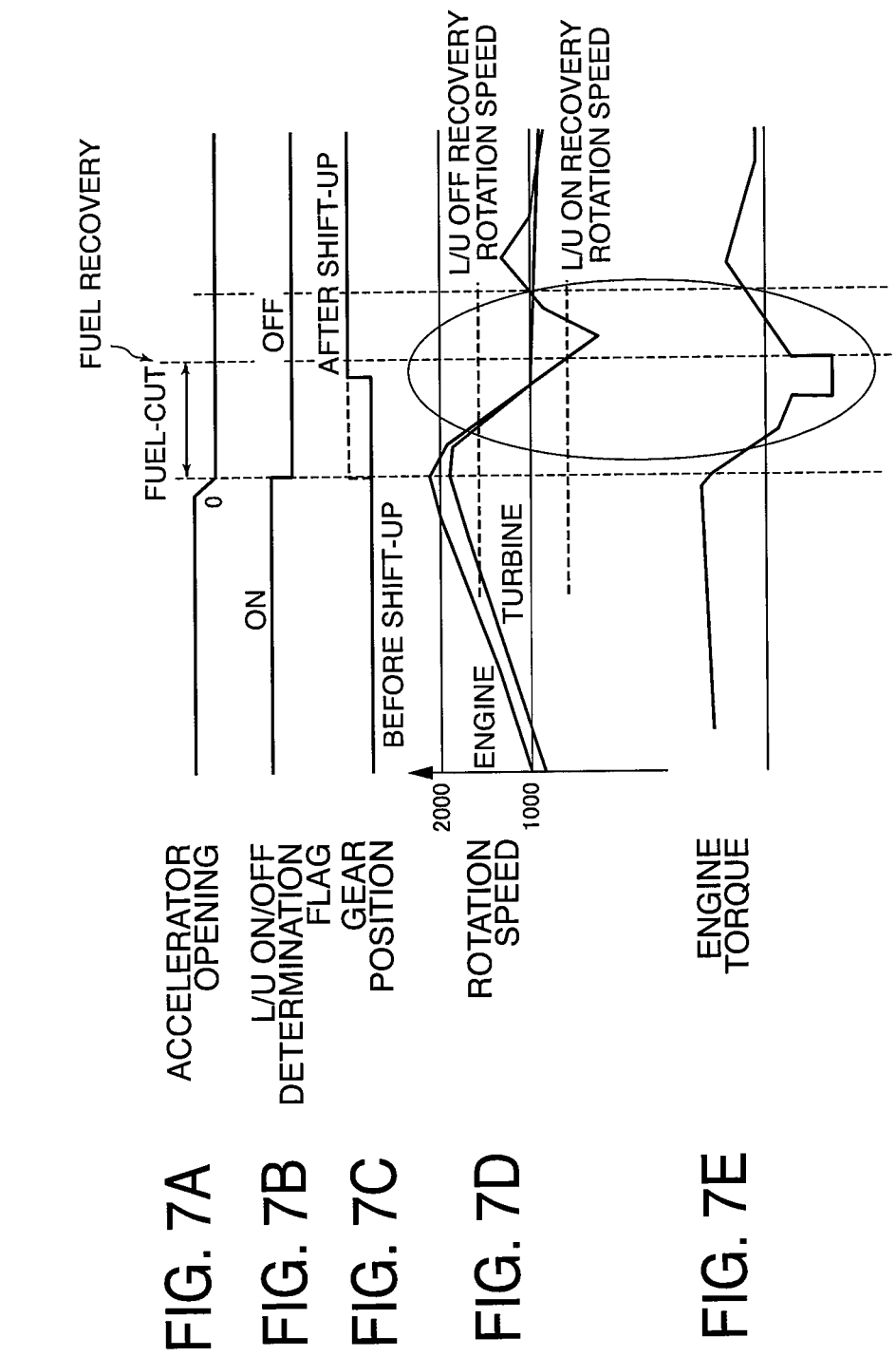

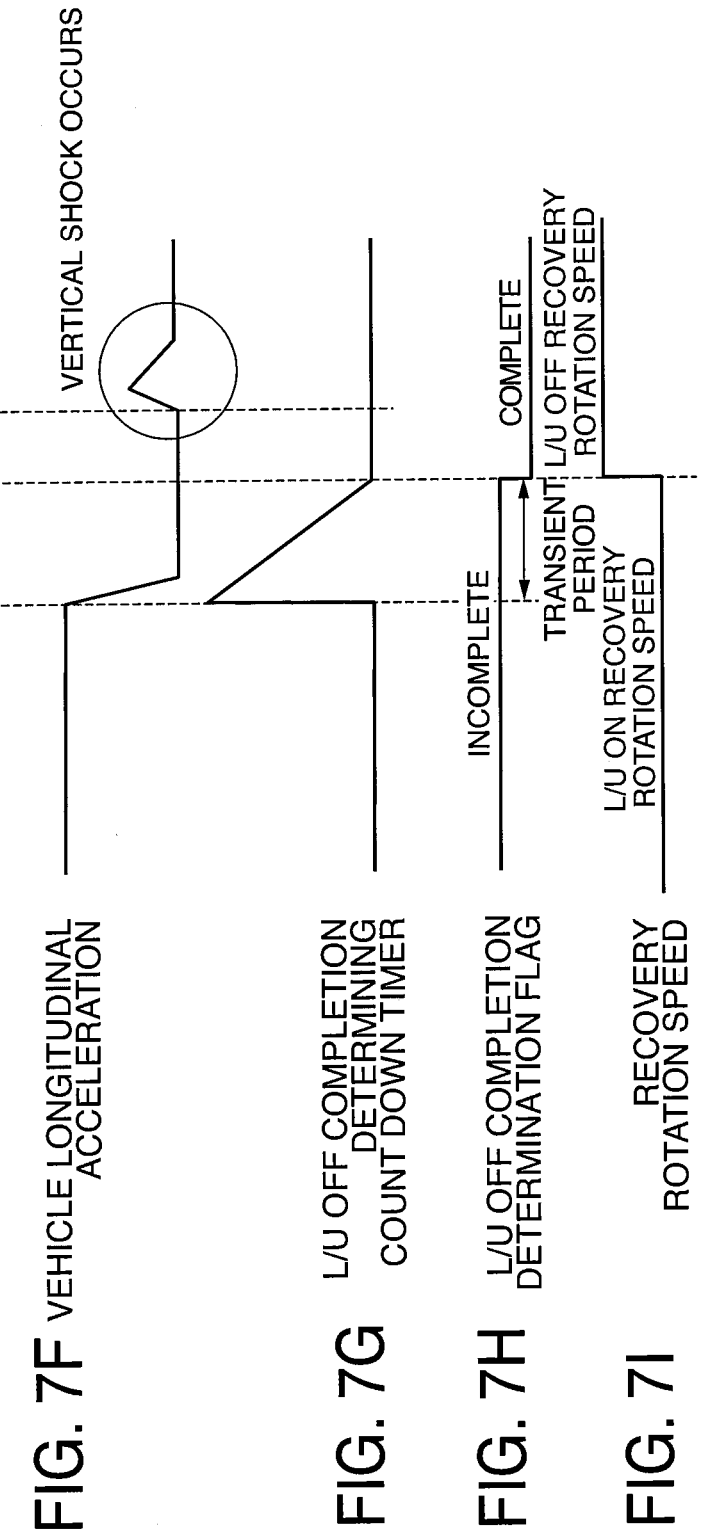

VEHICLE DRIVING DEVICE AND VEHICLE DRIVING METHOD

FIELD OF THE INVENTION

This invention relates to a driving force control in a vehicle having a stepped automatic transmission.

BACKGROUND OF THE INVENTION

When a vehicle in which an output power of an internal combustion engine is transmitted to drive wheels via an automatic transmission and a torque converter having a lockup clutch performs coast running in which an accelerator pedal is not depressed, a known driving force control in which the lockup clutch is unlocked and a fuel supply to the internal combustion engine is prevented may be applied to suppress fuel consumption.

When a rotation speed of the internal combustion engine decreases as a result of interrupting fuel supply, fuel supply to the internal combustion engine is resumed. Herein, prevention of the fuel supply to the internal combustion engine is so-called a "fuel-cut," and resumption of fuel supply to the internal combustion engine is so-called a "fuel recovery" or simply a "recovery."

In order to prevent a difference of timings between a fuel recovery operation and a lockup clutch unlocking operation from generating a torque shock, JP 2006-15819 A, published by The Japan Patent Office in 2006, proposes to perform a regenerative braking at the time of the fuel recovery operation.

SUMMARY OF THE INVENTION

If a driver releases the accelerator pedal during a vehicle running while the lockup clutch is locked, it is possible that a so-called foot release shift-up operation in which the lockup clutch is unlocked and the automatic transmission is shifted to a higher-speed gear may be performed. In this case also, since the accelerator opening is zero, a fuel-cut operation is performed to prevent fuel supply to the internal combustion engine.

During the foot release shift-up operation, the engine rotation speed decreases due to the fuel-cut operation. If a fuel recovery operation is performed while the lockup clutch is unlocked, a rotation speed of the internal combustion engine abruptly rises. As a result, a driving torque transmitted to the drive wheels via the torque converter also abruptly increases, and this generates a shock in a longitudinal direction of the vehicle. This shock may make a driver or a passenger feel uncomfortable.

It is therefore an object of this invention to prevent a shock generated in the fuel recovery operation during the foot release shift-up operation.

In order to achieve the above object, this invention applies to a vehicle driving device that transmits a rotation of an internal combustion engine that is responsive to a depression amount of an accelerator pedal to a drive wheel via a torque converter and an automatic transmission.

The device comprises a lockup clutch that performs a lockup and an unlock operations of the torque converter and a programmable controller programmed to perform a fuel-cut operation to stop fuel supply to the internal combustion engine, cause the lockup clutch to perform an unlock operation, and cause an automatic transmission to perform a shift-up operation when an accelerator pedal is released during a vehicle running, predict if a fuel recovery operation is to be performed as a result of the fuel-cut operation, the unlock operation of the lockup clutch, and the shift-up operation, and prohibit the fuel-cut operation when the fuel recovery operation is predicted to be performed.

The details as well as other features and advantages of this invention are set forth in the remainder of the specification and are shown in the accompanying drawings.

BRIEF DESCRIPTION OF THE DRAWINGS

FIGS. 3A to 3I are timing charts illustrating a driving force control result obtained by executing the driving force control routine;

FIGS. 4A to 4I are timing charts illustrating a driving force control result in a comparison example in which a part of steps of the driving force control routine are omitted;

FIGS. 6A to 6I are timing charts illustrating a driving force control result obtained by executing the driving force control routine of FIG. 5; and FIGS. 7A to 7I are timing charts illustrating a driving force control result in a comparison example in which a part of steps of the driving force control routine of FIG. 5 are omitted.

DESCRIPTION OF THE PREFERRED EMBODIMENTS

Figure 1:
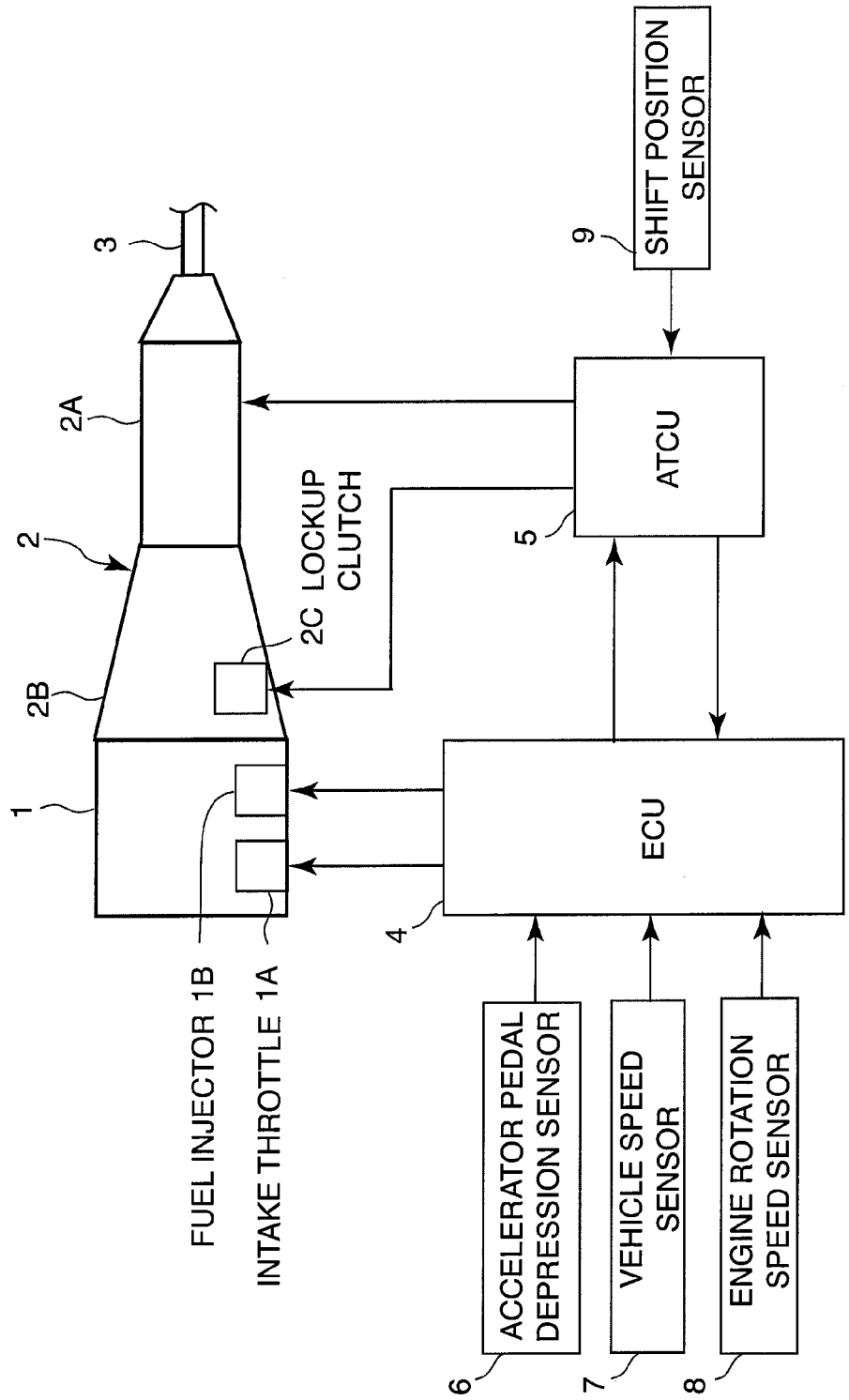
FIG. 1 is a schematic diagram illustrating a vehicle driving device according to this invention.

Referring to FIG. 1 of the drawings, a vehicle driving device according to an embodiment of this invention comprises an internal combustion engine 1 and a speed change unit 2 that transmits a rotation output from the internal combustion engine 1 to a propeller shaft 3 after changing a rotation speed thereof.

The internal combustion engine 1 comprises an intake throttle 1A and a fuel injector 1B.

The speed change unit 2 comprises a torque converter 2B, an automatic transmission 2A that changes an output rotation of the torque converter 2B, and a hydraulic lockup clutch 2C.

The torque converter 2B comprises a pump impeller coupled to a rotation shaft of the internal combustion engine 1 and a turbine runner coupled to an input shaft of the automatic transmission 2A. The torque converter 2B transmits a torque using a hydraulic fluid between the pump impeller and the turbine runner. The automatic transmission 2A comprises a planetary gear set having a high clutch and a low brake.

The lockup clutch 2C directly couples the pump impeller and the turbine runner when it is in a lockup state. When the lockup clutch 2C is unlocked, a relative rotation between the pump impeller and the turbine runner is allowed.

Lockup and unlock operations of the lockup clutch 2C and engagement/disengagement of the high clutch and the low brake of the automatic transmission 2A are controlled by an automatic transmission controller (ATCU) 5 using a pumping pressure of a hydraulic pump provided as an accessory of the internal combustion engine 1.

An opening of the intake throttle 1A for adjusting an intake air amount of the internal combustion engine 1 and a fuel injection by the fuel injector 1B of the internal combustion engine 1 are respectively controlled by an engine controller (ECU) 4.

Each of the ECU 4 and the ATCU 5 comprises a microcomputer having a central processing unit (CPU), a read-only memory (ROM), a random access memory (RAM), and an input/output interface (I/O interface). One or both of the ECU 4 and the ATCU 5 may comprise a plurality of microcomputers. Alternatively, the ECU 4 and the ATCU 5 may be integrated into a single microcomputer.

The ECU 4 receives, via a signal circuit, detection data from an accelerator pedal depression sensor 6 that detects a depression amount (accelerator opening) of an accelerator pedal of a vehicle, a vehicle speed sensor 7 that detects a vehicle running speed, and an engine rotation speed sensor 8 that detects a rotation speed of the internal combustion engine 1.

The ATCU 5 receives detection data from a shift position sensor 9 that detects a shift position of a selector lever provided in a vehicle via a signal circuit.

The ECU 4 and the ATCU 5 are connected to each other via a control area network (CAN) communication.

In the configuration described above, as the accelerator pedal is released while the lockup clutch 2C is locked, the ATCU 5 outputs a signal for instructing an unlock operation of the lockup clutch 2 and a signal for instructing a shift-up operation of the automatic transmission 2A.

Next, a summary of the driving force control in this vehicle driving device will be described.

The ATCU 5 controls lockup and unlock operations of the lockup clutch 2C and shift-up/shift-down operations of the automatic transmission 2A depending on a vehicle driving condition such as an accelerator opening and a vehicle speed.

The ECU 4 controls fuel injection of the internal combustion engine 1 depending on a driving condition such as an accelerator opening. When the accelerator opening is not zero, that is, when the accelerator pedal is depressed, the ECU 4 controls the fuel injection amount depending on the accelerator opening. This is a conventional fuel injection control. Meanwhile, when the accelerator opening is equal to zero, that is, when the accelerator pedal is released, the ECU 4 performs a fuel-cut operation or a fuel recovery operation.

Which of the fuel-cut operation or the fuel recovery operation is performed by the ECU 4 is determined based on the engine rotation speed in order to avoid a so-called engine stall generated when the engine rotation speed excessively decreases, such that autonomous engine rotation cannot be maintained.

When the engine rotation speed is equal to or higher than a recovery rotation speed while the accelerator opening is equal to zero, the ECU 4 performs the fuel-cut operation. When the engine rotation speed is lower than the recovery rotation speed while the accelerator opening is equal to zero, the ECU 4 performs the fuel recovery operation.

The recovery rotation speed is set to a different value depending on a condition of the lockup clutch 2C.

The recovery rotation speed is set to a different value because a decrease rate of the engine rotation speed caused by the fuel-cut operation is different depending on which of a lockup state (L/U ON) or an unlock state (L/U OFF) the lockup clutch 2C has. Specifically, the decrease rate of the engine rotation speed caused by the fuel-cut operation is higher in the L/U OFF state than that in the L/U ON state. In order to avoid an engine stall, it is necessary to set the L/U OFF recovery rotation speed to be higher than the L/U ON recovery rotation speed.

Herein, the recovery rotation speed in the L/U ON state is set to 800 revolutions per minute (rpm). The recovery rotation speed in the L/U OFF state is set to 1600 rpm. That is, the recovery rotation speed of the lockup state of the lockup clutch 2C is set to be lower than the recovery rotation speed of the unlock state of the lockup clutch 2C.

In addition, the fuel-cut operation does not start immediately after a driver releases the accelerator pedal. That is, the fuel-cut operation does not start immediately when the accelerator opening changes to zero, but starts when a predetermined time elapses after the driver releases the accelerator pedal. This is called a cut-in delay. During the cut-in delay, an engine torque down control is performed as a preliminary control.

If the fuel-cut operation starts as the accelerator opening changes to zero, an engine torque decrease amount (hereinafter, referred to as a torque gap) increases, and a shock caused by the torque gap makes the driver feel uncomfortable. In this regard, in order to alleviate the torque gap, a torque down control is performed by reducing the torque gap before the fuel-cut operation starts.

The torque down control is performed by retarding a fuel ignition timing. Specifically, the fuel ignition timing is gradually retarded during the cut-in delay to gradually lower the engine torque.

Figure 2:
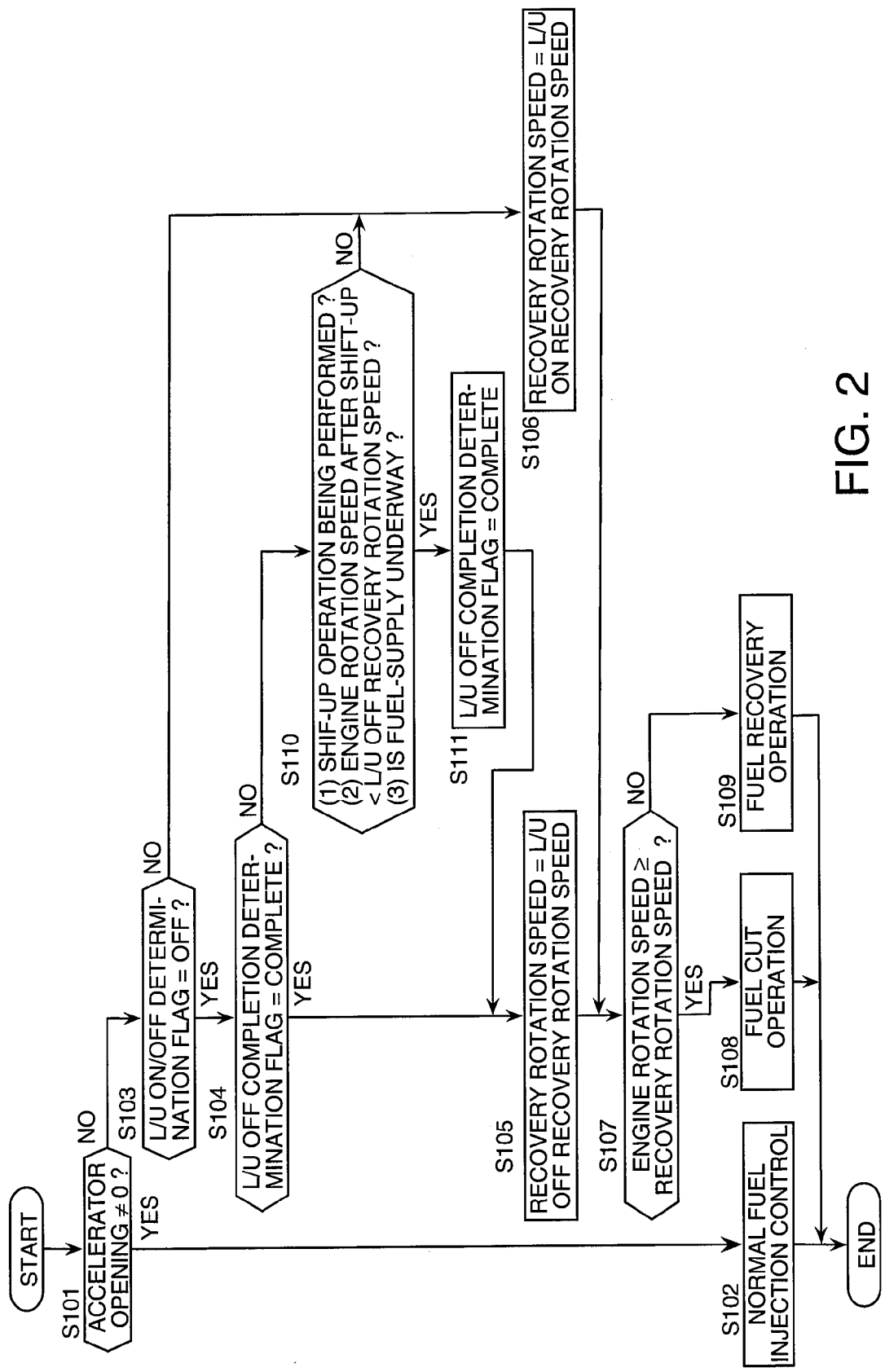
FIG. 2 is a flowchart illustrating a driving force control routine executed by an engine controller according to a first embodiment of this invention.

Referring to FIG. 2 next, a driving force control routine executed by the ECU 4 for the aforementioned control will be described.

This routine is repeatedly executed by the ECU 4 at a certain time interval of, for example, 10 milliseconds, during a vehicle running.

In a step S101, the ECU 4 determines whether or not the accelerator opening is equal to zero based on the input signal from the accelerator pedal depression sensor 6. When the driver depresses the accelerator pedal, the accelerator opening is not zero. In this case, the ECU 4 executes the processing of a step S102. When the driver does not depress the accelerator pedal, the accelerator opening is equal to zero. In this case, the ECU 4 performs the processing of a step S103.

In the step S102, the ECU 4 performs a conventional fuel injection control of the internal combustion engine 1. Specifically, the opening of the intake throttle 1A is controlled depending on the accelerator opening, and the fuel injection control is performed based on the intake air amount at that time and a target air-fuel ratio. After the processing of the step S102, the ECU 4 terminates the routine.

In the step S103, the ECU 4 determines whether or not an L/U ON/OFF determination flag is set to "OFF." The L/U ON/OFF determination flag is a flag indicating whether or not the unlock operation is instructed to the lockup clutch 2C.

In the step S103, when the L/U ON/OFF determination flag is set to "OFF," the ECU 4 performs the processing of a step S104. In the step S103, when the L/U ON/OFF determination flag is set to "ON," the ECU 4 performs the processing of a step S106.

The L/U ON/OFF determination flag is transmitted to the ECU 4 from the ATCU 5 via a CAN communication. The ATCU 5 selects whether the lockup clutch 2C of the torque converter 2B is locked or unlocked depending on a vehicle driving condition such as an accelerator opening or a vehicle speed. Herein, the lockup state comprises a perfect lockup state and a slip lockup state. When the lockup state is selected, the L/U ON/OFF determination flag is set to "ON." When the unlock state is selected, the L/U ON/OFF determination flag is set to "OFF."

In the step S104, the ECU 4 determines whether or not the L/U OFF completion determination flag is set to "COM- PLETE." If the determination in the step S104 is affirmative, the ECU 4 performs the processing of a step S105. If the determination in the step S104 is negative, the ECU 4 performs the processing of a step S110.

The L/U OFF completion determination flag is a flag set by the ECU 4. The L/U OFF completion determination flag is set to "COMPLETE" or "INCOMPLETE" depending on whether or not the lockup clutch 2C is perfectly unlocked. The L/U OFF completion determination flag is set to "COMPLETE" if the lockup clutch is perfectly unlocked. The L/U OFF completion determination flag is set to "INCOMPLETE" if the lockup clutch 2C is not perfectly unlocked, that is, when the lockup clutch 2C is in a perfect lockup state or a slip lockup state.

Specifically, the ECU4 sets the L/U OFF completion determination flag based on the L/U ON/OFF determination flag transmitted from the ATCU 5. When the L/U ON/OFF determination flag switches from "ON" to "OFF," the L/U OFF completion determination flag is maintained in "INCOMPLETE" until a predetermined time elapses from the switching. As a predetermined time elapses from the switching, the L/U OFF completion determination flag switches to "COMPLETE."

Herein, the predetermined time is a time necessary until the perfect unlock state from the start of the unlock operation of the lockup clutch 2C. When the L/U ON/OFF determination flag does not switch, the L/U OFF completion determination flag is maintained in the "INCOMPLETE" state as long as the L/U ON/OFF determination flag is maintained in the "ON" state. The L/U OFF completion determination flag once switched to "COMPLETE" is maintained in the "COMPLETE" state as long as the L/U ON/OFF determination flag is set to "OFF."

In the step S105, the ECU 4 sets the recovery rotation speed to the L/U OFF recovery rotation speed and performs the processing of a step 5107. In this embodiment, the L/U OFF recovery rotation speed is set at 1600 rpm.

In the step S106, the ECU 4 sets the recovery rotation speed to the L/U ON recovery rotation speed and performs the processing of the step S107. In this embodiment, the L/U ON recovery rotation speed is set at 800 rpm.

The recovery rotation speed is an engine rotation speed serving as a reference of the fuel recovery operation that means resumption of fuel supply from the fuel-cut operation or the fuel supply interruption state caused by the fuel-cut operation. The ECU 4 performs the fuel-cut operation when the engine rotation speed is higher than the recovery rotation speed while the accelerator opening is equal to zero. In addition, the ECU 4 performs the fuel recovery operation when the engine rotation speed is lower than the recovery rotation speed during the fuel-cut operation. The processing of the step S105 means that the recovery rotation speed is set to the L/U OFF recovery rotation speed of 1600 rpm if the lockup clutch 2C is unlocked. Otherwise, if the lockup clutch 2C is locked up, or in the course of the unlock operation, the processing of the steps S1 to S7 means that the recovery rotation speed is set to the L/U ON recovery rotation speed of 800 rpm.

In the step S107, the ECU 4 determines whether or not the engine rotation speed is equal to or higher than the recovery rotation speed. If the engine rotation speed is equal to or higher than the recovery rotation speed, the ECU 4 performs the processing of a step S108. If the engine rotation speed is lower than the recovery rotation speed, the ECU 4 performs the processing of a step S109.

In the step S108, the ECU 4 performs the fuel-cut operation to stop the engine fuel injection. After the processing of the step S108, the ECU 4 terminates the routine.

In the step S109, the ECU 4 performs the fuel recovery operation to resume the engine fuel injection. After the processing of the step S109, the ECU 4 terminates the routine.

Meanwhile, in the step S110, when the determination of the step S104 is negative, the ECU 4 performs the following prediction. Specifically, the ECU 4 predicts whether or not the fuel recovery operation is performed when the fuel-cut operation, the lockup clutch unlock operation, and the foot release shift-up operation are simultaneously performed.

The prediction as to whether or not the fuel recovery operation will be performed is determined depending on the following conditions (1) to (3). If all of the conditions (1) to (3) are satisfied, the ECU 4 predicts that the fuel recovery operation will be performed. If at least one of the conditions (1) to (3) is not satisfied, the ECU 4 predicts that the fuel recovery operation will not be performed.

(1) The shift-up operation control is under execution;
(2) The engine rotation speed after the shift-up operation is lower than the L/U OFF recovery rotation speed; and
(3) Fuel supply is underway.

The conditions (1) and (2) are to predict the fuel recovery operation, and the condition (3) is to determine whether or not prediction of the fuel recovery operation is necessary.

The condition (1) is determined based on a signal transmitted to the ECU 4 from the ATCU 5 via a CAN communication. The determination is affirmative in the course of the shift-up operation control. Otherwise, the determination is negative.

The engine rotation speed $Ne_{(N+1)}$ of the condition (2) after the shift-up operation is computed by multiplying a gear ratio of the automatic transmission after the shift-up operation, or a gear ratio corresponding to an (N+1)th speed level, by the current running speed. The condition (2) is satisfied, when the engine rotation speed after the shift-up operation is lower than the L/U OFF recovery rotation speed. Otherwise, if the engine rotation speed after the shift-up operation is equal to or higher than the L/U OFF recovery rotation speed, the condition (2) is not satisfied.

Alternatively, the engine rotation speed used in the computation may be estimated from the rotation speed of the turbine runner of the torque converter 2B without detecting the engine rotation speed using the engine rotation speed sensor 8. In this case, it is possible to omit the engine rotation speed sensor 8.

The condition (3) is determined based on whether or not a fuel-cut signal is output to the internal combustion engine 1 from the ECU 4.

If all of the conditions (1) to (3) are satisfied, the ECU 4 predicts that the fuel recovery operation is performed. In this case, the ECU 4 changes the L/U OFF completion determination flag from "INCOMPLETE" to "COMPLETE" in a step S111. Subsequently, in the step S105, the recovery rotation speed is set to the L/U OFF recovery rotation speed of 1600 rpm. As the accelerator pedal is released, the engine rotation speed abruptly decreases compared to a state where the accelerator pedal is depressed. For this reason, if the recovery rotation speed is set to the L/U OFF recovery rotation speed of 1600 rpm, the engine rotation speed is lower than the recovery rotation speed in most case.

By setting the recovery rotation speed in this manner, the determination of the step S107 changes to be negative and the fuel-cut operation is substantially prohibited. Since the L/U OFF completion determination flag is set to "COMPLETE" in the subsequent routine execution, the determination of the step S104 changes to be affirmative. Therefore, in the step S105, the recovery rotation speed is maintained in the L/U OFF recovery rotation speed, and the determination of the step S107 continues to be negative. As a result, in the step S109, the fuel recovery operation is performed, and the fuel-cut operation is continuously substantially prohibited.

Meanwhile, if any one of the conditions (1) to (3) is not satisfied in the step S110, the ECU 4 predicts that the fuel recovery operation will not be performed. In this case, the ECU 4 sets the recovery rotation speed to the L/U ON recovery rotation speed of 800 rpm in the step 106. In this case, if the engine rotation speed is high, the determination of the step S107 changes to be affirmative and the fuel-cut operation is executed in the step S108.

Through the processing of the steps S104 to S106, S110, and S111, the ECU 4 predicts whether or not the fuel recovery operation will be performed after the shift-up operation as the engine speed decreases when the fuel-cut operation and the shift-up operation are simultaneously performed. In this manner, it is possible to predict whether or not fuel recovery operation is executed with high accuracy by comparing the engine rotation speed after the shift-up operation and the recovery rotation speed.

If all of the conditions (1) to (3) are satisfied, the ECU 4 increments the recovery rotation speed and substantially prohibits the execution of the fuel-cut operation by setting the recovery rotation speed to the L/U OFF recovery rotation speed. It should be noted that, in the step S111, the L/U OFF completion determination flag is forcedly set to "COMPLETE" in order to force the determination of the step S104 to be affirmative at all times in the subsequent routine execution. As long as the determination of the step S104 is affirmative, the recovery rotation speed is maintained at the L/U OFF recovery rotation speed of 1600 rpm in the step S105.

A typical fuel-cut algorithm is performed in the steps S107 to S109.

Specifically, in the step S107, the ECU 4 determines whether or not the engine rotation speed is equal to or higher than the recovery rotation speed. If the determination is affirmative, the fuel-cut operation is executed in the step S108. If the determination is negative, the fuel recovery operation is performed in the step S109. In other words, a fuel injection corresponding to the accelerator opening of zero is performed by prohibiting the fuel-cut operation. After the processing of the step S108 or S109, the ECU 4 terminates the routine.

Herein, the recovery rotation speed used in determination of step S107 is set to the L/U OFF recovery rotation speed when the processing of step S105 is performed. When the processing of step S106 is performed, the recovery rotation speed of step S107 is set to L/U ON recovery rotation speed. The processing of step S105 is performed when the lockup clutch 2C is perfectly unlocked or when all of the conditions (1) to (3) are satisfied in step S110, or in other words, when it is predicted that the fuel recovery operation caused by the shift-up operation is performed.

If the recovery rotation speed is set to the L/U OFF recovery rotation speed of 1600 rpm, the fuel-cut operation is not performed as long as the engine rotation speed is lower than 1600 rpm. As the recovery rotation speed is set to the L/U OFF recovery rotation speed, execution of the fuel-cut operation is substantially prohibited. Typically, the engine rotation speed does not become higher than 1600 rpm when the accelerator opening is equal to zero.

In this manner, by increasing the recovery rotation speed when conditions (1) to (3) are satisfied, it is possible to easily prohibit the fuel-cut operation without directly operating the output signal to the fuel injector 1B. It should be noted that the L/U OFF completion determination flag switches from "INCOMPLETE" to "COMPLETE" in the step S111 before the recovery rotation speed is set to the L/U OFF recovery rotation speed in the step S105. For this reason, in the subsequent routine execution, the determination of the step S104 changes to be affirmative.

If the accelerator pedal is depressed again, and the accelerator pedal is then released, determination in the both steps S101 and S103 changes to be negative. In addition, the recovery rotation speed is maintained at the L/U OFF recovery rotation speed until the recovery rotation speed is set to the L/U ON recovery rotation speed in the step S106.

If the fuel-cut operation is performed during the foot release shift-up operation, and the fuel recovery operation is performed after the shift-up operation, a rotation speed of the internal combustion engine 1 may abruptly rise, so that a driving torque of the drive wheel output to the propeller shaft 3 significantly changes. This change may generate a shock of a vehicle and may make the driver or a passenger feel uncomfortable. In this driving force control device, when it is determined that the engine rotation speed after the shift-up operation is lower than the recovery rotation speed, that is, when it is predicted the fuel recovery operation caused by the shift-up operation will be performed, the fuel-cut operation is prohibited by increasing the recovery rotation speed to the L/U OFF recovery rotation speed. Therefore, according to this driving force control routine, it is possible to prevent a shock caused by the fuel recovery operation generated in the foot release shift-up operation.

It should be noted that, in the driving force control routine of FIG. 2, suppression of the fuel-cut operation is restricted to the following cases. Specifically, the fuel-cut operation is suppressed if it is predicted that the rotation speed of the internal combustion engine 1 after the shift-up operation is lower than the recovery rotation speed in the so-called foot release shift-up operation, in which an accelerator pedal is released during a vehicle running, and the automatic transmission 2A is shifted up. By prohibiting the fuel-cut operation under such a restricted condition, it is possible to prevent a shock caused by the fuel recovery operation immediately after the shift-up operation and an increase of the fuel consumption caused by unnecessary prohibition of the fuel-cut operation.

Referring to FIGS. 3A to 3I and 4A to 4I next, a result of executing the driving force control routine of FIG. 2 will be described. FIGS. 3A to 3I illustrate a result of the driving force control routine of FIG. 2. FIGS. 4A to 4I illustrate a comparative example.

In the comparative example, the steps S110 and S111 of the driving force control routine of FIG. 2 are omitted. In addition, when the determination of the step S104 is negative, the recovery rotation speed is set to the L/U ON recovery rotation speed of 800 rpm at all times in the step S106. In this comparative example, compared to the driving force control routine of FIG. 2, a process of predicting whether or not the fuel recovery operation will be executed when the fuel-cut operation, the shift-up operation of the automatic transmission 2A, and the unlock operation of the lockup clutch 2C are performed and a process of prohibiting the fuel-cut operation based on this determination are omitted.

First, referring to FIGS. 4A to 4I, the comparative example will be described.

Herein, as the accelerator pedal is released during a vehicle running, an unlocking operation of the lockup clutch 2C from the lockup state and the shift-up operation of the automatic transmission 2A are executed. A description will now be made on how to perform the fuel recovery operation and the fuel-cut operation of the internal combustion engine 1 in this case.

As the driver releases the accelerator pedal at a timing t0 during a vehicle running, the accelerator opening becomes zero as illustrated in FIG. 4A.

As the driver releases the accelerator pedal, the ATCU 5 changes the L/U ON/OFF determination flag from "ON" to "OFF" as illustrated in FIG. 4B. The ATCU 5 starts the unlock operation for changing the lockup clutch 2C from the lockup state to the perfect unlock state and the foot release shift-up operation of the automatic transmission 2A.

The stepped automatic transmission 2A performs a gear shift operation by engaging and disengaging a plurality of frictional engagement elements called a high clutch and a low brake. For this reason, the gear shift operation is performed in two phases including a torque phase and an inertia phase. In the torque phase, an input rotation speed of the automatic transmission 2A does not change, but only an output shaft torque of the automatic transmission 2A changes in response to the engagement/disengagement operation of the frictional engagement element. In the inertia phase, a real gear shift ratio changes, or in other words, an input rotation speed of the automatic transmission 2A changes. Here, an operation of the frictional engagement element that generates the torque phase is called a torque phase operation, and an operation of the frictional engagement element for generating the inertia phase is called an inertia phase operation.

In this comparative example, the torque phase operation is performed during a period between the timing t0 and a timing t1 in FIG. 4C, and the inertia phase operation is performed during a period between the timing t1 and a timing t3.

Meanwhile, the ECU 4 starts the fuel-cut operation described below as the accelera10/31/2013tor pedal is released at timing to. Specifically, at timing t0, the lockup clutch 2C is not perfectly unlocked immediately after the unlock operation starts. Therefore, the ECU 4 maintains the L/U OFF completion determination flag in "INCOMPLETE" as illustrated in FIG. 4I. Since the L/U OFF completion determination flag is maintained in "INCOMPLETE," the ECU 4 selects the L/U ON recovery rotation speed of 800 rpm as the recovery rotation speed as illustrated in FIG. 4D. In this case, since the engine rotation speed is higher than the L/U ON recovery rotation speed, the fuel-cut operation is performed after the timing t0 in FIG. 4D.

The fuel-cut operation comprises a torque down control performed by retarding the fuel ignition timing between the timing t0 and a timing t2 and a fuel-cut operation performed after the timing t2.

For retarding the fuel ignition timing, as illustrated in FIG. 4H, the engine torque gradually decreases by gradually increasing the retard amount between the timings t0 and t2.

With respect to the fuel-cut operation, the fuel injection of the internal combustion engine 1 stops after the timing t2. As a result, the engine torque decreases in a stepwise manner. However, since the torque down control is performed in advance, the torque gap is insignificant, and the driver does not feel uncomfortable.

Through the unlock operation of the lockup clutch 2C, the foot release shift-up operation, and the fuel-cut operation described above, the engine rotation speed and the turbine rotation speed gradually decrease between the timings t0 and t3 as illustrated in FIG. 4D.

After the timing t3, the turbine rotation speed stays at a vehicle speed equivalent value. However, the engine rotation speed further decreases. This is called a free fall descent. At the timing t3, the foot release shift-up operation of the automatic transmission 2A is completed as illustrated in FIG. 4C, and the unlock operation of the lockup clutch 2C also advances to nearly the perfect unlock state as illustrated in FIG. 4I. The free fall descent of the engine rotation speed is generated under such a condition.

At a timing t4 when a predetermined time elapses after the timing t0, the ECU 4 switches the L/U OFF completion determination flag from "INCOMPLETE" to "COMPLETE" as illustrated in FIG. 4I. Herein, the predetermined time is set in advance as a time necessary to obtain the perfect unlock state after the start of the unlock operation of the lockup clutch 2C. The ECU 4 determines that the lockup clutch 2C is perfectly unlocked at the timing t4 when the predetermined time elapses from the timing t0.

As the L/U OFF completion determination flag is switched from "INCOMPLETE" to "COMPLETE" at the timing t4, the recovery rotation speed is switched from the L/U ON recovery rotation speed of 800 rpm to the L/U OFF recovery rotation speed of 1600 rpm as illustrated in FIG. 4D.

In this case, since the engine rotation speed is lower than the L/U OFF recovery rotation speed, a fuel-cut flag is switched from "ON" to "OFF" as illustrated in FIG. 4G, so that the fuel recovery operation is executed. Herein, the fuel-cut flag is a flag used to distinguish between execution of the fuel-cut operation and non-execution of the fuel-cut operation. If the fuel-cut flag is set to "ON," that means the fuel-cut operation is executed. If the fuel-cut flag is set to "OFF," that means the fuel-cut operation is not executed.

As the fuel injection of the internal combustion engine 1 is resumed by the fuel recovery operation after the timing t4, the engine torque increases as illustrated in FIG. 4E. Accordingly, the engine rotation speed is changed from a free fall state to a rising state as illustrated in FIG. 4D. The rise of the engine rotation speed is terminated when the engine rotation speed exceeds the turbine rotation speed at a timing t5. Then, the engine rotation speed and the turbine rotation speed are maintained at a substantially equal level. In this manner, it is possible to avoid an engine stall.

In this comparative example, as an accelerator pedal is released during a vehicle running, the unlock operation of the lockup clutch 2C, the shift-up operation of the automatic transmission 2A, and the fuel-cut operation of the internal combustion engine 1 are simultaneously performed. Then, the fuel recovery operation is executed. For this reason, however, the following problems may occur.

Specifically, as the engine rotation speed surpasses the turbine rotation speed from a rotation speed lower than the turbine rotation speed at the timing t5 as illustrated in FIG. 4D, a speed ratio of the torque converter 2B, that is, the turbine rotation speed/the engine rotation speed is changed from a region equal to or greater than unity to a region smaller than unity. As a result, a torque capacity coefficient of the torque converter 2B abruptly increases, and a transmission torque increases. This increase in the transmission torque generates a vertical shock in a vehicle longitudinal acceleration as illustrated in FIG. 4F and makes the driver feel uncomfortable.

Meanwhile, by executing the driving force control routine of FIG. 2 according to the embodiment of this invention, it is possible to prevent a vertical shock generated in the comparative example of FIGS. 4A to 4I.

Referring to FIGS. 3A to 3I, a result of executing this driving force control routine will be described.

The embodiment of FIGS. 3A to 3I is different from the comparative example of FIGS. 4A to 4I mainly in the timing of changing the L/U OFF completion determination flag from "INCOMPLETE" to "COMPLETE."

As the driver releases the accelerator pedal at the timing t0 during a vehicle running, the accelerator opening becomes zero as illustrated in FIG. 3A.

The ATCU 5 changes the L/U ON/OFF determination flag from "ON" to "OFF" at the timing t0 as illustrated in FIG. 3B to start an unlock operation for changing the lockup clutch 2C from the lockup state to the perfect unlock state. In addition, the ATCU 5 starts the foot release shift-up operation of the automatic transmission 2A.

In this foot release shift-up operation, the torque phase operation is performed between the timings t0 and the timing t1, and the inertia phase operation is performed between the timing t1 and the timing t3. In the inertia phase operation, a control is executed to decrease the input rotation speed of the automatic transmission 2A.

Meanwhile, the ECU 4 predicts that the fuel recovery operation will be executed after the unlock operation of the lockup clutch 2C, the shift-up operation of the automatic transmission 2A, and the fuel-cut operation of the internal combustion engine 1 are simultaneously performed. This prediction is performed in the step S110 relating to the driving force control routine executed at the timing t0. Based on this prediction, the ECU 4 immediately prohibits the torque down operation and the fuel-cut operation performed by cutting off a fuel.

Specifically, in the step S111 of the driving force control routine executed at the timing t0, the ECU 4 switches the L/U OFF completion determination flag from "INCOMPLETE" to "COMPLETE" regardless of a real lockup/unlock state of the lockup clutch 2C as illustrated in FIG. 3I. As the L/U OFF completion determination flag is switched to "COMPLETE," the recovery rotation speed is switched from the L/U ON recovery rotation speed of 800 rpm to the L/U OFF recovery rotation speed of 1600 rpm.

As a result, after the timing t0, the engine rotation speed is lower than the recovery rotation speed at all times as illustrated in FIG. 3D. Therefore, the fuel-cut flag is continuously maintained in the OFF state after the timing t0 as illustrated in FIG. 3G, and the fuel-cut operation is continuously prohibited.

By prohibiting the fuel-cut operation, the engine rotation speed and the turbine rotation speed gradually decrease between the timings t0 and t3 in which the foot release shift-up operation is completed as illustrated in FIG. 3D. After the timing t3, the turbine rotation speed is maintained in a vehicle speed equivalent value, and the engine rotation speed is also approximately equal to the turbine rotation speed.

For this reason, different from the comparative example of FIGS. 4A to 4I, a phenomenon in which the engine rotation speed is lowered in a free falling manner to a rotation speed lower than the turbine rotation speed after the timing t3, and then the engine rotation speed exceeds the turbine rotation speed does not occur. The vehicle longitudinal acceleration decreases through the torque phase operation between the timings t0 and t1. However, the vehicle longitudinal acceleration is stabilized to an approximately constant value after the timing t1, and a vertical shock is not generated after the timing t5 in FIG. 4F.

In this driving force control routine, it is predicted that the fuel recovery operation is performed when overall conditions are satisfied, including a condition that the shift-up operation control is under execution, a condition that the engine rotation speed after the shift-up operation is lower than the L/U OFF recovery rotation speed, and a condition that the fuel-cut operation is not under execution at the current time. Therefore, it is not necessary to add a complicated prediction method in order to predict whether or not the fuel recovery operation will be performed. That is, it is possible to easily design a control system provided with such a driving force control routine.

In this driving force control routine, the fuel-cut operation is prohibited just by changing the L/U OFF completion determination flag from "INCOMPLETE" to "COMPLETE" regardless of the lockup/unlock state of the lockup clutch 2C. Therefore, it is not necessary to add a new prohibition control, and it is possible to prevent a shock generated by the fuel recovery operation during the foot release shift-up operation without sophisticating the driving force control routine.

Referring to FIGS. 5, 6A to 6I, and 7A to 7I, a second embodiment of this invention will be described.

Similar to the first embodiment, the vehicle driving device according to the second embodiment has the configuration illustrated in FIG. 1. The second embodiment is different from the first embodiment in that the ECU 4 executes a driving force control routine of FIG. 5 instead of the driving force control routine of FIG. 2.

Figure 5:
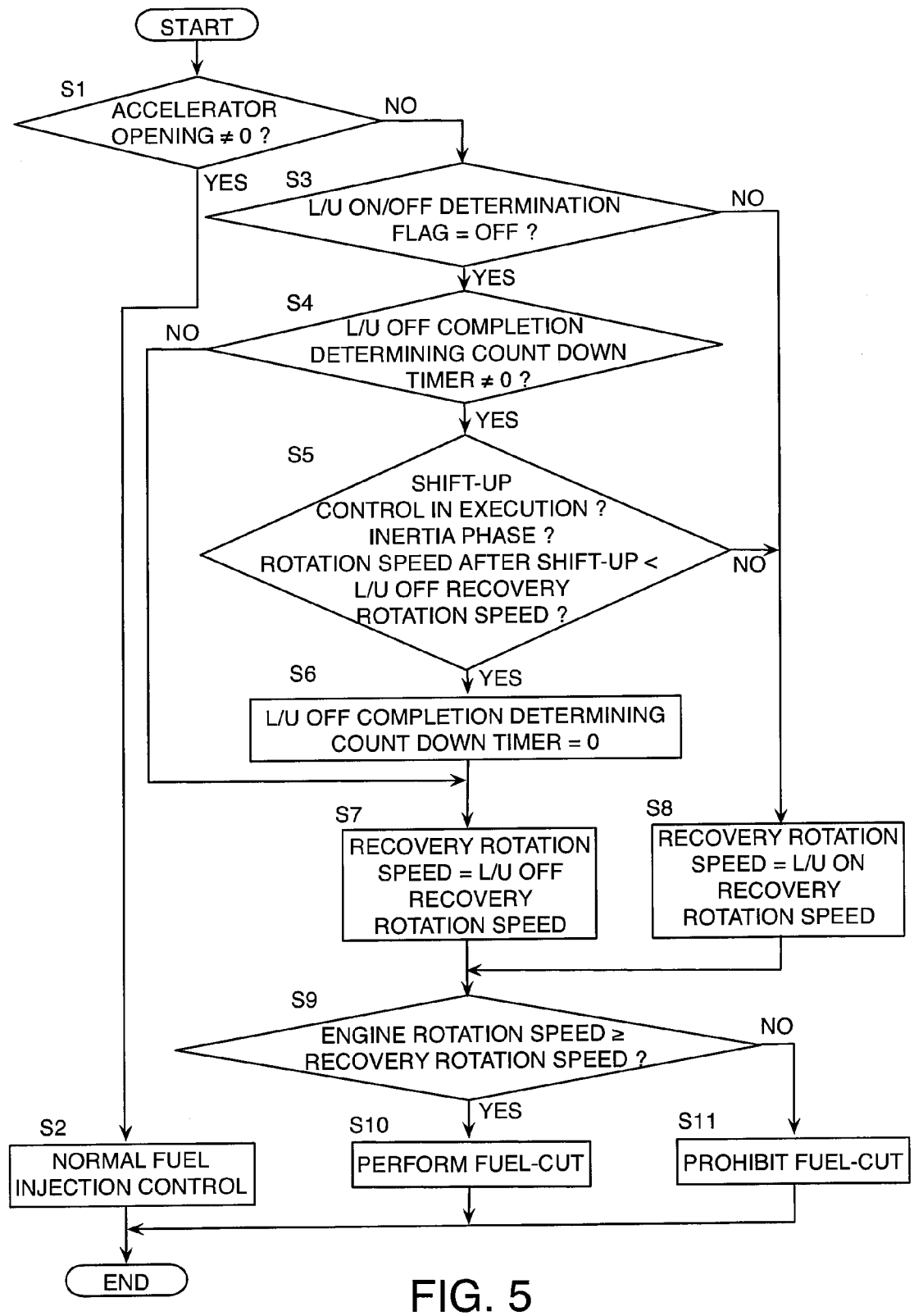
FIG. 5 is a flowchart illustrating a driving force control routine executed by an engine controller according to a second embodiment of this invention.

Referring to FIG. 5, the driving force control routine according to the second embodiment will now be described. This routine is also repeatedly executed by the ECU 4 during a vehicle running at a constant time interval of, for example, 10 milliseconds.

In a step S1, the ECU 4 determines whether or not the accelerator opening is equal to zero. If it is determined that the accelerator opening is not equal to zero, a conventional fuel injection control is performed depending on the accelerator opening in a step S2. Then, the routine is terminated.

If it is determined that the accelerator opening is equal to zero in the step S1, the ECU 4 determines whether or not the L/U ON/OFF determination flag is set to "OFF" in a step S3.

In the step S3, if the L/U ON/OFF determination flag is not set to "OFF," that means an unlock operation is not instructed to the lockup clutch 2C. In this case, the ECU 4 sets the recovery rotation speed to the L/U ON recovery rotation speed of 800 rpm in a step S8 and then performs the processing of a step S9. If the L/U ON/OFF determination flag is set to "OFF" in the step S3, the ECU 4 performs the processing of a step S4.

In the step S4, the ECU 4 determines whether or not the L/U OFF completion determining countdown timer is a non-zero value. A certain time interval is necessary until the lockup clutch 2C is completely unlocked after there is an instruction for unlocking the lockup clutch 2C having a lockup state. The L/U OFF completion determining countdown timer detects that a certain time interval elapses after the L/U ON/OFF determination flag is changed to "OFF" by performing a countdown. The ECU 4 determines that the lockup clutch 2C is completely unlocked when the value of the L/U OFF completion determining countdown timer becomes zero. If the value of the L/U OFF completion determining countdown timer is not zero, the ECU 4 determines that the lockup clutch 2C is in the course of the unlock operation.

In the step S4, if the L/U OFF completion determining countdown timer is a non-zero value, the ECU 4 performs the processing of the step S5. If the L/U OFF completion determining countdown timer is equal to zero, the ECU 4 performs the processing of a step S7.

In the step S5, it is determined whether or not all of the conditions (1) to (3) described above are satisfied.

If all of the conditions (1) to (3) are satisfied, and the fuel-cut operation is performed, it is predicted that the fuel recovery operation will be executed immediately after the shift-up operation is instructed. At this time, the execution of the fuel recovery operation generates a rise of the rotation speed of the internal combustion engine 1 and abruptly increases a torque transmitted to the drive wheels through the torque converter 2B. This may make the driver or the passenger feel shock as a change in the vehicle longitudinal acceleration.

In this regard, if all of the conditions (1) to (3) are satisfied in the step S5, the ECU 4 resets the L/U OFF completion determining countdown timer to zero in a step S6 in order to prevent the fuel recovery operation immediately after the shift-up operation. Then, in the step S7, the recovery rotation speed is set to the L/U OFF recovery rotation speed of 1600 rpm higher than the L/U ON recovery rotation speed. Through this setting, the execution of the fuel-cut operation is suppressed. Meanwhile, if at least one of the conditions (1) to (3) is not satisfied in the step S5, the ECU 4 sets the recovery rotation speed to the L/U ON recovery rotation speed in the step S8 and then performs the processing of steps S9 to S11. The processing of the steps S9 to S11 is similar to the processing of the steps S107 to S109 in the first embodiment.

A result of the driving force control routine of FIG. 5 will be described with reference to FIGS. 6A to 6I and FIGS. 7A to 7I. Herein, FIGS. 6A to 6I illustrate a result of the driving force control routine of FIG. 5. FIGS. 7A to 7I illustrate a comparative example.

In the comparative example, the steps S5 and S6 are omitted from the driving force control routine of FIG. 5. In addition, the determination in the step S4 affirmative, the process advances to the step S8.

First, a comparative example will be described.

As the accelerator opening becomes zero as illustrated in FIG. 7A, the L/U ON/OFF determination flag is set to OFF as illustrated in FIG. 7B. In addition, an unlock instruction is transmitted to the lockup clutch 2C, and a shift-up operation instruction is transmitted to the automatic transmission 2A. At the same time, the L/U OFF completion determining countdown timer starts to operate as illustrated in FIG. 7G. The L/U OFF completion determining countdown timer is operated in synchronization with the L/U OFF completion determination flag of FIG. 7H. The L/U OFF completion determination flag is initially set to "INCOMPLETE" and switches to "COMPLETE" as the countdown timer value of the L/U OFF completion determining countdown timer becomes zero.

Meanwhile, if the engine rotation speed is higher than the recovery rotation speed when the accelerator opening becomes zero as illustrated in FIG. 7D, the fuel-cut operation is automatically executed. Herein, a case is shown where the lockup clutch 2C is unlocked from the lockup state as illustrated in FIG. 7B. For this reason, the recovery rotation speed used at this time is the L/U ON recovery rotation speed of 800 rpm.

As a result of the fuel-cut operation, the engine torque decreases as illustrated in FIG. 7E. In addition, as illustrated in FIG. 7D, the engine rotation speed also decreases.

If the engine rotation speed becomes lower than the recovery speed, the fuel recovery operation is executed, so that the engine torque temporarily decreases and abruptly increases as illustrated in FIG. 7E. This change is transmitted to the vehicle drive wheels via the torque converter 2B and generates a fluctuation in the vehicle longitudinal acceleration as indicated by a circle in FIG. 7F. This generates a shock in a vehicle. Similarly, in this case, as the L/U OFF completion determining countdown timer becomes zero as illustrated in FIG. 7G, and the L/U OFF completion determination flag switches from "INCOMPLETE" to "COMPLETE" as illustrated in FIG. 7H, the recovery rotation speed switches from the L/U ON recovery rotation speed to the L/U OFF recovery rotation speed as illustrated in FIG. 7I.

FIGS. 6A to 6I illustrate a result of control when the driving force control routine of FIG. 5 is executed. In this case, when the accelerator pedal is released, and the foot release shift-up operation of the automatic transmission 2A is performed as illustrated in FIGS. 6A to 6C, it is determined whether or not the fuel recovery operation is predicted immediately after the shift-up operation. Specifically, it is determined whether or not all of the conditions (1) to (3) are satisfied in the step S5. If the determination in the step S5 is affirmative, execution of the fuel-cut operation in the foot release shift-up operation state is suppressed by immediately switching the recovery rotation speed to the lockup OFF recovery rotation speed of 1600 rpm as illustrated in FIG. 6I. For this reason, an abrupt rise of the engine torque and an accompanying vehicle shock caused by the fuel recovery operation immediately after the shift-up operation in the case of FIGS. 7A to 7I is not generated as indicated by the circle of FIGS. 6E and 6F. Therefore, the driver or the passenger does not feel uncomfortable.

According to the second embodiment described above, if all of the conditions (1) to (3) are satisfied in the foot release shift-up operation, the recovery rotation speed is set to the L/U OFF recovery rotation speed in the step S7, and the L/U OFF completion determining countdown timer is reset to zero in the step S6. As a result, it is possible to control allowance/prohibition of the fuel-cut operation based on the lockup/unlock instruction for the lockup clutch 2C. However, it is not necessary to set the recovery rotation speed to the L/U OFF recovery rotation speed. In summary, the recovery rotation speed is increased such that the fuel-cut operation is significantly restricted when all of the conditions (1) to (3) are satisfied in the foot release shift-up operation. In addition, the control is preferably performed based on the L/U OFF completion determining countdown timer, but this is not mandatory.

According to the second embodiment, the fuel-cut operation is suppressed by increasing the recovery rotation speed. As a result, it is possible to easily suppress the fuel-cut operation without changing the basic algorithm of the steps S9 to S11 for performing the fuel-cut operation of the fuel injector 1B and the fuel recovery operation. Alternatively, the fuel-cut operation may be directly suppressed when all of the conditions (1) to (3) are satisfied in the foot release shift-up operation.

As an alternative example of the suppression of the fuel-cut operation of the internal combustion engine 1, the fuel-cut operation may be prohibited for a part of cylinders of the internal combustion engine 1. Even in this example, it is possible to alleviate a shock generated in the fuel recovery operation.

In the first and second embodiments described above, the accelerator pedal depression sensor 6 serves as means for detecting an accelerator pedal depression amount, and the engine rotation speed sensor 8 serves as means for detecting an engine rotation speed. In addition, the ATCU 5 servers as means for performing a shift-up operation, and the ECU 4 serves as means for performing a fuel-cut operation, means for performing a fuel recovery operation, means for predicting a fuel recovery operation, and means for suppressing the fuel-cut operation.

The contents of Tokugan 2011-200189, with a filing date of Sep. 14, 2011 in Japan, are hereby incorporated by reference.

Although this invention has been described above with reference to certain embodiments, this invention is not limited to the embodiments described above. Modifications and variations of the embodiments described above will occur to those skilled in the art, within the scope of the claims.

As described above, in the vehicle driving device according to this invention, it is possible to prevent a shock caused by the foot release shift-up operation. Therefore, it is possible to improve a drive feeling of a vehicle such as an automobile.

The embodiments of this invention in which an exclusive property or privilege is claimed are defined as follows:

What is clamied is:

1. A vehicle driving device that transmits a rotation of an internal combustion engine that is responsive to a depression amount of an accelerator pedal to a drive wheel of a vehicle via a torque converter and an automatic transmission, comprising:
    a lockup clutch that performs a lockup and an unlock operations of the torque converter; and
    a programmable controller programmed to:
        perform a fuel-cut operation to stop fuel supply to the internal combustion engine, cause the lockup clutch to perform the unlock operation, and cause the automatic transmission to perform a shift-up operation, when the accelerator pedal is released while the vehicle is running;
        predict if a fuel recovery operation to resume fuel supply to the internal combustion engine is to be performed as a result of the fuel-cut operation, the unlock operation, and the shift-up operation; and
        prohibit the fuel-cut operation when the fuel recovery operation is predicted to be performed.

2. The vehicle driving device according to claim 1, wherein the controller is further programmed to:
    perform the fuel recovery operation when an engine rotation speed becomes lower than a recovery rotation speed in a state where the fuel-cut operation is performed, and
    predict that the fuel recovery operation is to be performed as a result of the fuel-cut operation, the unlock operation of the lockup clutch, and the shift-up operation, when the engine rotation speed after the shift-up operation is calculated to be lower than the recovery rotation speed.

3. The vehicle driving device according to claim 1, wherein the controller is further programmed to:
    perform the fuel recovery operation when an engine rotation speed becomes lower than a recovery rotation speed in a state where the fuel-cut operation is performed,
    set the recovery rotation speed to a lockup state recovery rotation speed, when the lockup clutch is in a lockup state
    set the recovery rotation speed to an unlock state recovery rotation speed, which is higher than the lockup state recovery rotation speed, when the lockup clutch is in an unlock state; and
    prohibit the fuel-cut operation by altering the recovery rotation speed to the unlock state recovery rotation speed from the lockup state recovery rotation speed irrespective of whether or not the lockup clutch is in the lockup state.

4. A vehicle driving device that transmits a rotation of an internal combustion engine that is responsive to a depression amount of an accelerator pedal to a drive wheel of a vehicle via a torque converter and an automatic transmission, comprising:
    a lockup clutch that locks up the torque converter when engaged and unlocks the torque converter when disengaged;
    an accelerator pedal depression sensor that detects the depression amount of the accelerator pedal;
    an engine rotation speed sensor that detects an engine rotation speed of the internal combustion engine; and
    a programmable controller programmed to:
        cause the lockup clutch to perform the unlock operation and cause the automatic transmission to perform a shift-up operation when the accelerator pedal is released from depression in a state where the lockup clutch is in a lockup state while the vehicle is running;
        perform a fuel-cut operation to stop fuel supply to the internal combustion engine when the engine rotation speed is higher than a predetermined recovery rotation speed in a state where the accelerator pedal is released;
        perform a fuel recovery operation to resume fuel supply to the internal combustion engine when the engine rotation speed becomes lower than the recovery rotation speed while the fuel-cut operation is performed;
        predict if the fuel recovery operation is to be performed, prior to performing the fuel recovery operation, as a result of the fuel-cut operation, the unlock operation, and the shift-up; and
        suppress the fuel-cut operation when the fuel recovery operation is predicted to be performed.

5. The vehicle driving device according to claim 4, wherein the controller is further programmed to calculate the engine rotation speed after the shift-up operation on the basis of a gear ratio of the automatic transmission after the shift-up operation and a vehicle speed, and predict that the fuel recovery operation is to be performed when the rotation speed after the shift-up operation is lower than the recovery rotation speed.

6. The vehicle driving device according to claim 4, wherein the controller is further programmed to selectively apply a lockup clutch OFF recovery rotation speed that is applied when the lockup clutch is engaged and a lockup clutch ON recovery rotation speed that is lower than the lockup clutch OFF recovery rotation speed and applied when the lockup clutch is disengaged, to the recovery rotation speed in response to an operation state of the lockup clutch, and not to predict that the fuel recovery operation is to be performed as long as the engine rotation speed immediately after the shift-up operation is not lower than the lockup clutch OFF recovery rotation speed.

7. The vehicle driving device according to claim 6, wherein the controller is further programmed to suppress the fuel-cut operation by altering the predetermined recovery rotation speed to the lockup clutch OFF recovery rotation speed from the lockup clutch ON recovery rotation speed.

8. A vehicle driving device that transmits a rotation of an internal combustion engine that is responsive to a depression amount of an accelerator pedal to a drive wheel of a vehicle via a torque converter and an automatic transmission, comprising:
    a lockup clutch that performs a lockup and an unlock operations of the torque converter;
    means for performing a fuel-cut operation to stop fuel supply to the internal combustion engine, cause the lockup clutch to perform the unlock operation and cause the automatic transmission to perform a shift-up operation, when the accelerator pedal is released while the vehicle is running;
    means for predicting if a fuel recovery operation to resume fuel supply to the internal combustion engine is to be performed as a result of the fuel-cut operation, the unlock operation, and the shift-up; and
    means for prohibiting the fuel-cut operation when the fuel recovery operation is predicted to be performed.

9. A vehicle driving method that transmits a rotation of an internal combustion engine responsive to a depression amount of an accelerator pedal to a drive wheel of a vehicle via a torque converter and an automatic transmission, the vehicle including a lockup clutch that performs a lockup and an unlock operations of the torque converter, the method comprising:
  performing a fuel-cut operation to stop fuel supply to the internal combustion engine, cause the lockup clutch to perform the unlock operation, and cause the automatic transmission to perform a shift-up operation, when the accelerator pedal is released while the vehicle is running;
  predicting if a fuel recovery operation to resume fuel supply to the internal combustion engine is to be performed as a result of the fuel-cut operation, the unlock operation, and the shift-up; and
  prohibiting the fuel-cut operation when the fuel recovery operation is predicted to be performed.

* * * * *